Sept. 7, 1948. F. J. SURK 2,448,636
CABLE SPLICING VISE
Filed Oct. 18, 1944 2 Sheets-Sheet 1
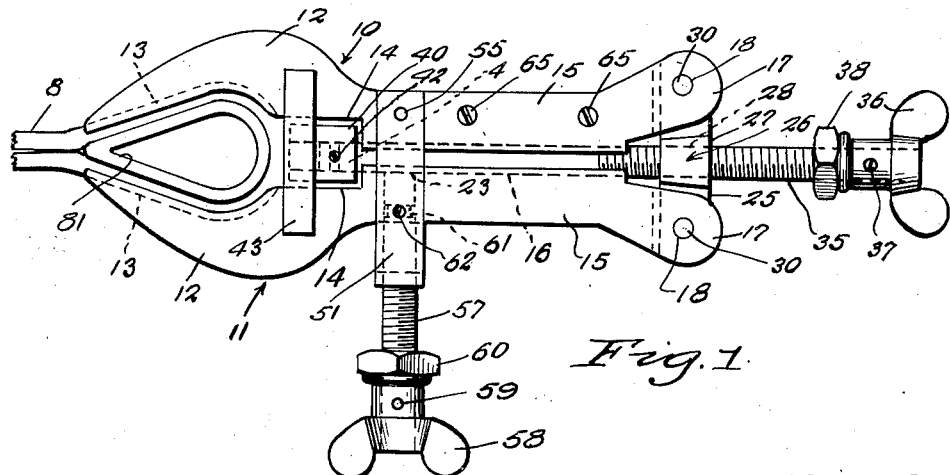
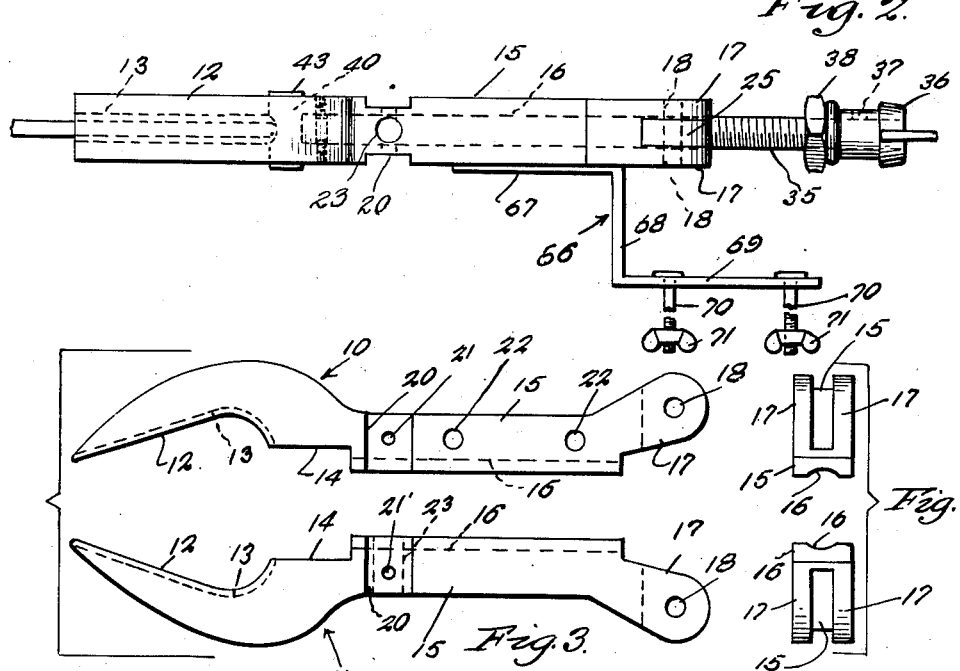
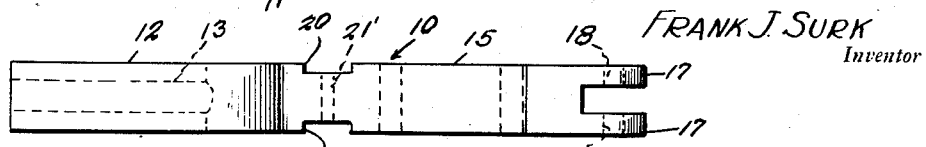
FRANK J. SURK
Inventor
By Clarence A. O'Brien
and Harvey B. Jacobson
Attorneys Sept. 7, 1948.   F. J. SURK   2,448,636
CABLE SPLICING VISE
Filed Oct. 18, 1944   2 Sheets-Sheet 2
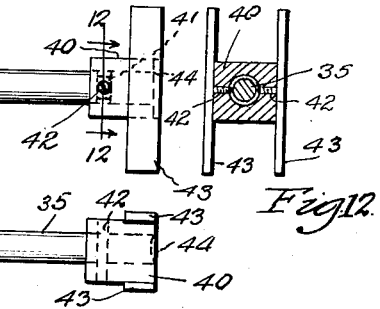
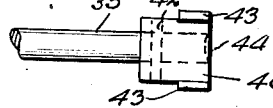
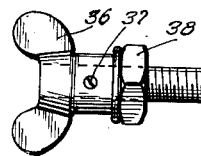
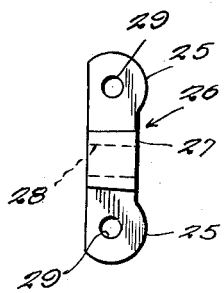
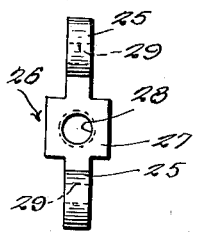
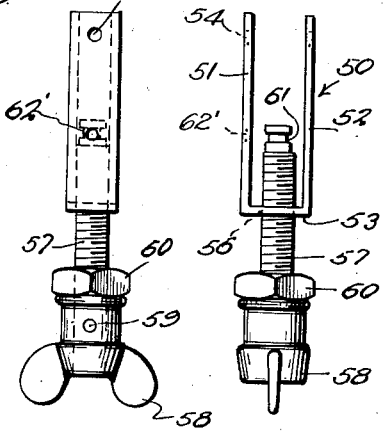
FRANK J. SURK
Inventor
By Clarence A. O'Brien
and Harvey B. Jacobson
Attorneys Patented Sept. 7, 1948

2,448,636

UNITED STATES PATENT OFFICE 2,448,636

CABLE SPLICING VISE

Frank J. Surk, Menominee, Mich.

Application October 18, 1944, Serial No. 559,316

2 Claims. (Cl. 81—17.5)

This invention relates to a cable splicing vise, and more particularly to such a vise for holding the looped ends of a cable in association with a cable thimble while the cable is spliced to form an eye at the end thereof.

A primary object of this invention is the provision of an improved cable vise adapted securely to hold a cable and an associated thimble in related assembly while the cable is spliced to secure the thimble therein.

An additional important object of this invention is the provision of such a vise which may be readily adjusted to accommodate a variety of sizes of cable.

Still another object is the provision of such a vise provided with jaws adapted to conform to the configuration of a cable loop and associated thimble, having means to hold the sides of the jaws closely about the thimble, and having additional means to hold the cable closely in association with the thimble at the extreme end thereof.

Additional objects reside in the provision of improved clamping means adapted to firmly effect such a grip as above mentioned.

Other objects reside in the combinations of elements, arrangements of parts and features of construction, all as will be more fully pointed out hereinafter and disclosed in the accompanying drawings, wherein there is shown a preferred embodiment of this inventive concept.

In the drawings:

Figure 1 is a top plan view of the vise of the instant invention, a supporting bracket being omitted and certain concealed parts thereof being indicated in dotted lines.

Figure 2 is a side elevational view of the vise shown in Figure 1 a transverse clamp being omitted.

Figure 3 is an exploded view showing the two jaws of the vise as detached from certain associated mechanism.

Figure 4 is a side elevational view of one of the jaws shown in Figure 3.

Figure 5 is an end elevational view of the jaws shown in Figure 3, as viewed from the right.

Figure 6 is a side elevational view of certain constructional elements.

Figure 7 is a fragmentary top plan view of certain portions of the elements shown in Figure 6.

Figure 8 is a side elevational view of an additional constructional element.

Figure 9 is an end elevational view of the element shown in Figure 8.

Figure 10 is a side elevational view of still further constructional elements, certain parts thereof being shown in dotted lines.

Figure 11 is an end elevational view of the structure shown in Figure 10, and

Figure 12 is a sectional view taken substantially along the line 12—12 of Figure 6, as viewed in the direction of the arrows.

Like reference numerals refer to like parts throughout the several views of the drawings.

Having reference now to the drawings, it will be seen that the vise of the invention is comprised of two oppositely disposed jaw members generally indicated at 10 and 11. Each of members 10 and 11 is provided with an arcuate cable-gripping portion 12, on the interior face of which is cut an arcuate groove or channel 13, adapted closely to conform to the configuration of the cable. Recesses 14 are cut in the members 10 and 11, adjacent the jaws 12, for a purpose to be more fully described hereinafter, and shank portions 15, each provided on its interior face with an arcuate groove or channel 16, extend from the jaw members 12. Shank portions 15 terminate in bifurcations 17 flared outwardly from the shanks and provided with apertures or bores 18 therethrough. Each of members 10 and 11 is provided with a pair of oppositely disposed, aligned, transverse grooves 20, for a purpose to be more fully described hereinafter, each provided with a bore extending through the shank portions 15, the bore 21 in member 10 being smooth and the bore 21' in member 11 being threaded. The shank 15 of member 10 is also provided with two bores 22 extending vertically therethrough, while member 11 is provided with a transverse bore 23 extending horizontally therethrough, in alignment with the channels 20 cut therein.

Positioned between the lugs 17 are the ends 25 of a member generally indicated at 26, which, as best shown in Figures 8 and 9, includes an enlarged central portion 27, rectangular in cross sectional configuration, adapted to fit between the flared bifurcations 17 of the shank members 15 and which is provided with a threaded bore 28 extending longitudinally therethrough. Each of end portions 25 is provided with a bore 29 adapted to be aligned with the bores 18 in lugs 17, and through which aligned bores pins 30 are adapted to be positioned to hold the parts in related assembly.

A threaded shaft 35 passes through bore 28 and is provided at one end with a wing nut 36 secured thereon, as by a pin 37, and a lock nut 38.

Shaft 35 extends inwardly through the channels 16 and terminates in a bore or recess in a block 40. The end of the shaft within the recess in block 40 is provided with a peripheral annulus or groove 41 adapted to engage the point of a set screw 42 passed through the block 40 to hold the parts in related assembly, the block being adapted to be positioned within the recessed space 14 extending from the space between the jaw members 12. Block 40 has secured to opposite faces thereof plates 43 adapted to overlie the edges of the recesses 14 to hold the block slidably therewithin. As best shown in Figure 7, the face of the block is provided with a groove 44 of arcuate configuration.

A U-shaped member generally indicated at 50 comprised of legs 51 and 52 and a transverse connecting section 53 is adapted to be positioned in the channels 20 of members 10 and 11. Suitable aligned apertures 54 are positioned in the legs 51 and 52, through which a pin 55 is adapted to be passed to secure the extremities of the legs in related assembly with jaw member 10. Portion 53 is provided with a threaded bore 56 through which is adapted to be passed a threaded rod 57 provided at its extremity with a wing nut 58 secured thereon, as by a pin 59, and a lock nut 60. The inner extremity of rod 57 is positioned in bore 23 and is provided with a channel or groove 61, adapted to be engaged by a suitable set screw 62 passed through the threaded bore 21' in groove 20 of the member 11 and through the bore 62' formed in the said leg 51. The said set screw 62 is, of course, actuated by a screwdriver or the like from the exterior of the said leg 51 through the bore 62'.

Means are provided for holding the vise in position on a bench or the like, such means taking the form of bolts or screws 65 passed through bores 22 in member 10, and engaging a bracket generally indicated at 66, comprised of a horizontal portion 67, a vertical portion 68 and a second horizontal portion 69 offset with respect to the portion 67, portion 69 being adapted to be secured to any desired supporting surface, as by bolts 70 passed through suitable apertures therein, and provided with wing nuts 71.

From the foregoing the method of operation and use of the device should be readily understandable. When it is desired to splice a cable 8 about a cable thimble 81 (see Fig. 1), the wing nut 58 is rotated to rotate rod 57, which, through its engagement with threaded bore 56, causes the jaw member 11 to move away from the member 10, and the wing nut 36, similarly rotated, to cause the block 40 to move to its innermost extent with respect to the recesses 14. The cable 80 is now looped about the thimble 81 and positioned between the jaws 12 of members 10 and 11. Reverse rotation of wing nut 36 now causes the rod 35 to move inwardly, and correspondingly causes the block 40 to move into abutting relation with the extremity of the cable loop, which seats within groove 44, thus holding the same securely against the thimble 81. The lock nut 38 may now be tightened to securely hold the rod 35 in its adjusted position.

Reverse rotation of wing nut 58 now causes inward movement of the jaws 12 of members 10 and 11 to tightly clamp the cable 80 about thimble 81, the extending portions thereof being seated in grooves 13. It will now be seen that the cable is tightly clamped in position within the vise, and the extending ends thereof may be suitably spliced in any desired manner to form a secure joint with the thimble 81 to provide an eye at the end of the cable.

Obviously, the device may be adapted to a variety of sizes of cable, the position of the jaws being readily movable to accommodate such sizes in the manner previously described.

From the foregoing it will be seen that there is herein provided a vise accomplishing all the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A cable splicing vise comprising a pair of spaced jaw members having shanks forming a recess at the juncture of said jaw members, guide grooves formed longitudinally in the inner surfaces of said shanks, outwardly flared bifurcations integral with said shank opposite said jaw members, a rigid member having a central threaded aperture and reduced opposed ends, pivot pins connecting the reduced ends and said bifurcations, a screw extending through said central aperture and positioned within said guide grooves, a block movably mounted in said recess and having said screw swivelly connected thereto, guide means attached to said block and slidably associated with the outer surfaces of said jaw members, and a clamp secured to said shanks for holding said jaw member in a selected position.

2. A cable splicing vise comprising a pair of spaced jaw members having shanks forming a recess at the juncture of said jaw members, guide grooves formed longitudinally in the inner surfaces of said shanks, outwardly flared bifurcations integral with said shank opposite said jaw members, a rigid member having a central threaded aperture and reduced opposed ends, pivot pins connecting the reduced ends and said bifurcations, a screw extending through said central aperture and positioned within said guide grooves, a block movably mounted in said recess and having said screw swivelly connected thereto, guide means attached to said block and slidably associated with the outer surfaces of said jaw members, and a clamp secured to staid shanks for holding said jaw member in a selected position, said guide means comprising a pair of substantially parallel plates overlying said recess.

FRANK J. SURK.

REFERENCES CITED

The following references are of record in the file of this patent:

UNITED STATES PATENTS

| Number | Name | Date |
|---|---|---|
| 422,013 | Ekstrom | Feb. 25, 1890 |
| 1,084,181 | Voight | Jan. 18, 1914 |
| 1,425,836 | Campbell | Aug. 15, 1922 |
| 1,534,066 | Larkey | Apr. 21, 1925 |
| 1,620,084 | Dowley | Mar. 8, 1927 |
| 1,879,099 | Coffey | Sept. 27, 1932 |
| 2,372,754 | Wickens | Apr. 3, 1945 |

FOREIGN PATENTS

| Number | Country | Date |
|---|---|---|
| 566,754 | France | Nov. 26, 1923 |
| 259,583 | Great Britain | May 19, 1927 |
| 61,490 | Norway | Oct. 2, 1939 |